US008364443B2

United States Patent
Noble et al.

(10) Patent No.: US 8,364,443 B2
(45) Date of Patent: Jan. 29, 2013

(54) FAULT ANALYSIS AND MONITORING APPLICATIONS USING OUT-OF-BAND BASED MODULES

(75) Inventors: Gayle L. Noble, Boulder Creek, CA (US); Lucy G. Hosking, Santa Cruz, CA (US); Luke M. Ekkizogloy, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 13/491,468

(22) Filed: Jun. 7, 2012

(65) Prior Publication Data
US 2012/0243866 A1    Sep. 27, 2012

Related U.S. Application Data

(63) Continuation of application No. 12/426,092, filed on Apr. 17, 2009, now abandoned.

(60) Provisional application No. 61/045,954, filed on Apr. 17, 2008, provisional application No. 61/045,950, filed on Apr. 17, 2008.

(51) Int. Cl.
*H03F 1/26*    (2006.01)

(52) U.S. Cl. .................................. 702/190; 702/198

(58) Field of Classification Search ............... 714/25, 714/712; 702/190, 198; 398/25, 140, 202
See application file for complete search history.

(56) References Cited

U.S. PATENT DOCUMENTS

| 7,263,597 | B2 * | 8/2007 | Everdell et al. | 712/11 |
| 7,792,425 | B2 * | 9/2010 | Aronson et al. | 398/30 |
| 2009/0265142 | A1 * | 10/2009 | Liu et al. | 702/190 |

* cited by examiner

*Primary Examiner* — Michael Nghiem
*Assistant Examiner* — Elias Desta
(74) *Attorney, Agent, or Firm* — Maschoff Gilmore & Israelsen

(57) ABSTRACT

One example embodiment includes a testing device. The testing device comprises a signal reception element, an out-of-band detector and testing logic. The signal reception element is configured to receive a physical layer signal from a communication module via a physical link and to produce an incoming double modulated signal, the incoming double modulated signal including a high-speed data signal and an out-of-band data signal. The out-of-band data signal comprises diagnostic data of the communication module. The out-of-band detector is coupled to the signal reception element and is configured to extract the out-of-band data signal from the incoming double modulated signal. The testing logic is coupled to the out-of-band detector and is configured to extract and analyze the diagnostic data from the out-of-band data signal.

18 Claims, 6 Drawing Sheets

FAULT ANALYSIS AND MONITORING APPLICATIONS USING OUT-OF-BAND BASED MODULES

CROSS-REFERENCE TO RELATED APPLICATIONS

This application is a continuation of U.S. patent application Ser. No. 12/426,092, now abandoned, filed Apr. 17, 2009, titled FAULT ANALYSIS AND MONITORING APPLICATIONS USING OUT-OF-BAND BASED MODULES, which claims the benefit of and priority to U.S. Provisional Application Ser. No. 61/045,954, entitled "FAULT ANALYSIS AND MONITORING APPLICATIONS USING OOB BASED SFPS," filed Apr. 17, 2008, and U.S. Provisional Application Ser. No. 61/045,950, entitled "OUT-OF-BAND DATA TRANSFER," filed Apr. 17, 2008, all of which are incorporated herein by reference in their entireties.

BACKGROUND OF THE INVENTION

1. The Field of the Invention

Embodiments of the invention relate generally to the field of data transmission in communication networks. More specifically, embodiments of the present invention relate to devices and systems for collecting physical layer data in communication networks.

2. The Relevant Technology

Modern day communication is, in large part, accomplished by transmitting and receiving large amounts of digital data. Digital data signals can be used to transmit information such as database information, financial information, personal and business information, and the like. In addition, digital data signals can be used to transmit voice, video, images etc.

Typically, data transmission in such networks is implemented by way of a communication module, such as a transceiver or transponder. A transceiver includes a signal power source including electronic hardware for transmitting data signals along a physical link such as a copper wire link or fiber-optic link. The signal power source may be a laser, electronic amplifier, radio transmitter or the like. The transceiver may also include a physical layer signal reception element to receive physical layer signals. The physical layer reception element may be a photodiode, an electronic amplifier, a radio receiver, or the like.

The transceiver may include electronic hardware for decoding signals that are sent between clients into data signals, such as binary representations, readable by digital devices or hosts to which the transceiver is connected. The transceiver may also include electronic hardware for encoding signals that are sent between clients from a binary representation to a physical layer level signal that can be transmitted across a physical link. Thus, in one example, a binary representation is converted to one of a modulated electronic signal, a modulated optical signal, a modulated radio signal or another appropriate signal.

A transceiver may communicate data for the benefit of the transceiver to the connected host device. For example, a transceiver may be configured to generate digital diagnostic information by monitoring the health of the transceiver. The transceiver may then communicate information about the health of the transceiver to its connected host. This communication typically takes place on an I²C or MDIO bus for communicating between integrated circuits. As a transceiver deteriorates due to age, component failure or other reasons, the host may be aware of the deterioration using such communications received from the transceiver.

Digital diagnostics logic (also referred to herein as "digital diagnostics") may be used to handle various tasks and to generate monitoring and operating data. These task and data may include some of the following:

Setup functions. These generally relate to the required adjustments made on a part-to-part basis in the factory to allow for variations in component characteristics such as laser diode threshold current.

Identification. This refers to general purpose memory, typically EEPROM (electrically erasable and programmable read only memory) or other nonvolatile memory. The memory may be accessible using a serial communication standard, that is used to store various information identifying the transceiver type, capability, serial number, and compatibility with various standards. While not standard, this memory may also store additional information, such as sub-component revisions and factory test data.

Eye safety and general fault detection. These functions are used to identify abnormal and potentially unsafe operating parameters and to report these to the host and/or perform laser shutdown, as appropriate.

Temperature compensation functions. For example, compensating for known temperature variations in key laser characteristics such as slope efficiency.

Monitoring functions. Monitoring various parameters related to the transceiver operating characteristics and environment. Examples of parameters that may be monitored include laser bias current, laser output power, receiver power levels, supply voltage and temperature. Ideally, these parameters are monitored and reported to, or made available to, a host device and thus to the user of the transceiver.

Power on time. The transceiver's control circuitry may keep track of the total number of hours the transceiver has been in the power on state, and report or make this time value available to a host device.

Margining. "Margining" is a mechanism that allows the end user to test the transceiver's performance at a known deviation from ideal operating conditions, generally by scaling the control signals used to drive the transceiver's active components.

Other digital signals. A host device may configure the transceiver so as to make it compatible with various requirements for the polarity and output types of digital inputs and outputs. For instance, digital inputs are used for transmitter disable and rate selection functions while outputs are used to indicate transmitter fault and loss of signal conditions. The configuration values determine the polarity of one or more of the binary input and output signals. In some transceivers, these configuration values can be used to specify the scale of one or more of the digital input or output values, for instance by specifying a scaling factor to be used in conjunction with the digital input or output value.

The data generated by the digital diagnostics described above is generally only available to the host on which a transceiver is installed. Thus, when troubleshooting problems with individual transceivers, a user must access the host on which the transceiver is installed to discover any digital diagnostic data about a transceiver. This may cause various difficulties when the host and transceiver are located in a remote location such as on the ocean floor or in remote desert locations. Further, some applications make use of repeaters, which are transceiver pairs that simply receive an optical data stream, amplify the optical data stream, and retransmit the optical data stream. In repeater applications, the digital diagnostic data is stored on the repeater. Thus to troubleshoot the repeater, the repeater must be physically retrieved and queried for any digital diagnostic data.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

Example embodiments of the invention relate to devices and systems for collecting physical layer data in communication networks.

One example embodiment includes a testing device. The testing device comprises a signal reception element, an out-of-band detector and testing logic. The signal reception element is configured to receive a physical layer signal from a communication module via a physical link and to produce an incoming double modulated signal, the incoming double modulated signal including a high-speed data signal and an out-of-band data signal. The out-of-band data signal comprises diagnostic data of the communication module. The out-of-band detector is coupled to the signal reception element and is configured to extract the out-of-band data signal from the incoming double modulated signal. The testing logic is coupled to the out-of-band detector and is configured to extract and analyze the diagnostic data from the out-of-band data signal.

Another example embodiment includes a system for collecting physical layer data for a physical link. The system comprises a first communication module configured to emit a physical layer signal onto a first physical link for reception by a second communication module. The physical layer signal comprises a double modulated signal modulated with a high-speed data signal and an out-of-band data signal. The out-of-band data signal comprises diagnostic data of the first communication module. The system also comprises means for receiving the physical layer signal, the means for receiving being coupled to the first physical link. The system also comprises means for extracting the out-of-band data signal from the physical layer signal, the means for extracting being coupled to the means for receiving. The system further comprises means for extracting and analyzing the diagnostic data from the out-of-band data signal to identify one or more physical conditions of the first physical link, the means for extracting and analyzing being coupled to the means for extracting.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
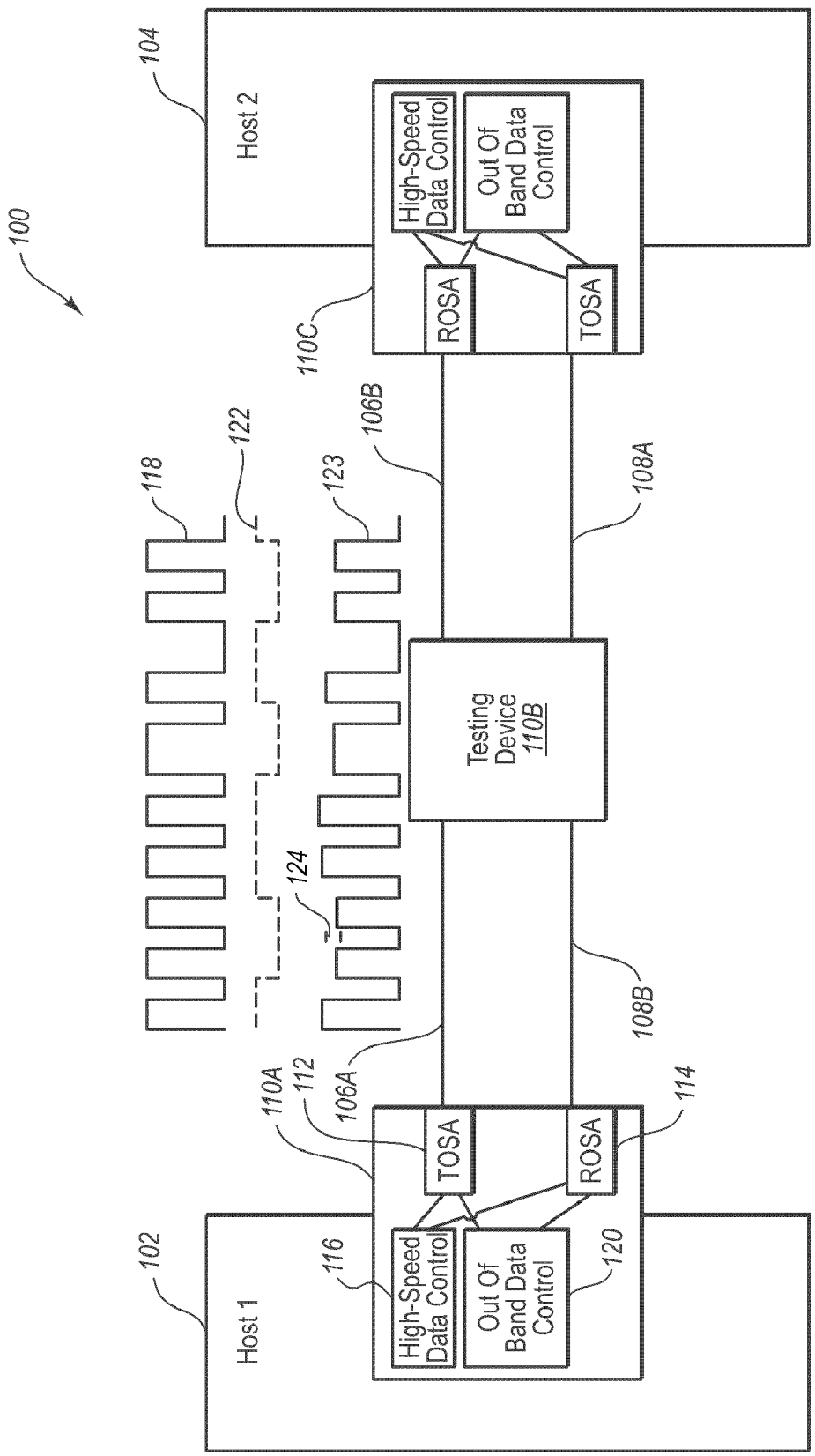
FIG. 1 illustrates an example communication network in which embodiments of the invention can be implemented.

Embodiments of the invention include devices, systems, and methods for collecting and analyzing out-of-band diagnostic data transmitted on a physical link between components in a network of connected hosts. This allows for monitoring and identifying physical conditions of the physical link. In some embodiments, the out-of-band diagnostic data is included in a double modulated signal that additionally includes high-speed data. As such, high-speed data that is ordinarily transmitted on the physical link can be transmitted with out-of-band data on the same physical link.

The term "high-speed data," as used herein, does not refer to any particular defined bandwidth or frequency of data. Rather, high-speed data refers to data typically transmitted on a network such as the data typically transmitted for the benefit of the various hosts on a network. High-speed data may also be referred to herein as in-band data which is a reference to the communication band typically used by host systems to communicate data. High-speed and in-band data are distinguished from out-of-band data which is typically used to transmit data from communication module to communication module. While a host may subsequently receive the out-of-band data, the host usually receives the out-of-band data from a communication module through a low speed bus such as an $I^2C$ or MDIO bus. This is contrasted to high-speed data which is typically received by a host from a communication module through some type of high-speed data interface. Notably, a host may also produce the out-of-band data and transmit the out-of-band data to a communication module on a low speed bus.

The term "diagnostic data" includes environmental and/or operational parameters measured by the communication modules at each end of a physical link. For instance, the parameters can include temperature, supply voltage, bias current, transmit power, receive power, error indicators such as Hi and Lo threshold alarms and warnings, power on time, and/or other parameters. Hi and Lo threshold alarms can be generated by a communication module when a particular parameter exceeds a given threshold. For instance, Hi and/or Lo threshold alarms can be generated when supply voltage exceeds a particular voltage range or when transmit power exceeds a particular power range, or the like.

Diagnostic data alternately or additionally includes data beyond environmental and/or operational parameters measured by the communication modules. For instance, diagnostic data can include control signals and/or firmware updates from a host to one or more communication modules. Alternately or additionally, diagnostic data can include identification/authentication data stored in memory of a communication module and provided to a host or other communication module for identification/authentication purposes.

Each physical link generally includes the hardware that interconnects two nodes in the network and can include, for example, the communication module at each node, a transmission medium, such as fiber optic cable or electrical cable, that interconnects the communication modules, connectors, and the like or any combination thereof. The parameters, either individually or in combination, are generally indicative of the physical condition of a physical link. Accordingly, by collecting and analyzing digital diagnostic data exchanged between the communication modules at each end of a physical link, the physical condition of the physical link can be determined, and if necessary, appropriate corrective action can be taken.

I. Example Communication Network

Referring now to FIG. 1, one example communication network 100 is disclosed in which embodiments of the invention can be practiced. The communication network 100 includes a first host device 102, a second host device 104, one or more physical links 106A, 106B, 108A, 108B and a system comprising components 110A-110C (referred to herein as "system 110") for collecting physical layer data, including diagnostic data. More particularly, the system 110 includes at least a first communication module 110A, a testing device 110B, and optionally a second communication module 110C.

The communication network 100 accomplishes digital communication using any one of a number of different models, including the Open Systems Interconnection ("OSI") model, although other models can alternately or additionally be employed. The OSI model defines a framework for accomplishing digital communications with seven layers on clients (e.g., hosts 102, 104) communicating in a network. These seven layers are understood by those of skill in the art, and include from the highest level to the lowest level: the application layer, the presentation layer, the session layer, the transport layer, the network layer, the data link layer, and the physical layer. At the application layer, data is used in end user processes. Data is packaged by each of the other layers of the OSI model prior to being sent using the physical layer. The physical layer defines how the data is actually sent on the network, such as by electrical signals, light carried on optical fibers, radio signals etc. Thus, at the physical layer, actual voltages, light levels and radio amplitudes or frequencies are defined as having certain logical values.

At the physical layer, one method of communicating digital data involves the use of communication modules, including transceiver modules or transponder modules. Communication modules can have a variety of different form factors, including SFF, SFP, SFP+, XFP, CFP, XPAK, XENPAK, without restriction. A communication module includes a signal power source including electronic hardware for transmitting data signals along a physical link such as a copper wire link or fiber-optic link. The signal power source may be a laser, electronic amplifier, radio transmitter or the like. The communication module may also include a physical layer signal reception element to receive physical layer signals. The physical layer reception element may be a photodiode, an electronic amplifier, a radio receiver, or the like.

The communication module may further include electronic hardware for decoding signals that are sent between clients into data signals, such as binary representations, readable by digital devices or hosts to which the communication module is connected. The communication module may also include electronic hardware for encoding signals that are sent between clients from a binary representation to a physical layer level signal that can be transmitted across a physical link. Thus, in one example, a binary representation is converted to one of a modulated electronic signal, a modulated optical signal, a modulated radio signal or another appropriate signal.

With continuing reference to FIG. 1, each of the first and second host devices 102, 104 comprises, for example, a media access controller ("MAC") card, a SONET framer, an FEC processor, or the like. Further, the first and second host devices 102, 104 are configured to communicate with each other via physical links 106A, 106B, 108A, 108B.

Physical links 106A, 106B (collectively "physical link 106") can include, for instance, at least a portion (such as a TOSA) of the first communication module 110A, one or more transmission media and/or connectors, and at least a portion (such as a ROSA) of the second communication module 110C. Similarly, physical links 108A, 108B (collectively "physical link 108") can include, for example, at least a portion (such as a TOSA) of the second communication module 110C, one or more transmission media and/or connectors, and at least a portion (such as a ROSA) of the first communication module 110A.

A. Communication Modules 110A, 110C

The first communication module 110A is configured to produce physical layer signals that include high-speed data received from the first host 102 and out-of-band data comprising diagnostic data generated by the first communication module 110A and/or received by the first communication module 110 from the first host 102. The first communication module 110A emits such physical layer signals onto physical link 106A for transmission to second communication module 110C. The second communication module 110C can be similarly configured to produce and emit physical layer signals onto physical link 108A using high-speed data received from the second host 104 and out-of-band data comprising diagnostic data generated by the second communication module 110C and/or received by the second communication module 110C from the second host 104.

The first communication module 110A is alternately or additionally configured to receive physical layer signals from physical link 108B, to extract high-speed data and out-of-band data from such physical layer signals, and to provide the extracted high-speed data and optionally the out-of-band data to the first host 102. Similarly, the second communication module 110C can alternately or additionally be configured to receive physical layer signals from physical link 106B, to extract high-speed data and out-of-band data from such physical layer signals, and to provide the extracted high-speed data and optionally the out-of-band data to the second host 104.

In more detail, the first communication module 110A includes a transmitter optical subassembly ("TOSA") 112 for transmitting physical layer signals across physical link 106A. The first communication module 110A also includes a receiver optical subassembly ("ROSA") 114 for receiving physical layer signals across physical link 108B. The TOSA 112 is connected to a high-speed data control 116, which may include a high-speed modulator that modulates the power output of a signal power source such as a laser in the TOSA 112 such that the high-speed data is converted to a form that can be transmitted across the physical link 106A. As shown in FIG. 1, the high-speed data control 116 modulates the TOSA 112 to produce a high-speed data signal 118. Also connected to the TOSA 112 is an out-of-band data control 120 or out-of-band logic, which may include an out-of-band modulator. The out-of-band data control 120 further modulates the laser in the TOSA 112 using the out-of-band data modulator such that an out-of-band data stream 122 is modulated onto the high-speed data signal 118 to produce an outgoing double modulated signal 123 that includes high-speed data and out-of-band data.

In the example shown, the modulations of the out-of-band data appear as a change in peak power 124 of the outgoing double modulated signal 123. Thus the outgoing double modulated signal 123 includes both high-speed data and out-of-band data. The out-of-band data may be modulated using a number of different modulation techniques including but not limited to phase shift keying, binary phase shift keying, quadrature phase shift keying, and Manchester encoding. The out-of-band data may actually have a frequency range that is orders of magnitude less than the in-band data. However, to illustrate the principle of double modulation in a simple graphical form, the frequency of the out-of-band data stream 122 is illustrated in FIG. 1 as having only a slightly lower frequency than the high-speed data signal 118. Regardless, the principles of the present invention are not limited to the relative frequency between the out-of-band data stream 122 and the high-speed data signal 118.

To perform receiving functions, the ROSA 114 includes a signal reception element such as an optical detector, including a photodiode, that receives an incoming double modulated signal. The ROSA 114 sends all or portions of the incoming double modulated signal to the out-of-band data control 120 and the high-speed data control 116. The out-of-band data control 120 may include an out-of-band demodulator that extracts the out-of-band data from the incoming double modulated signal. The high-speed data control 116 may include a high-speed data demodulator that extracts high-speed data from the incoming double modulated signal.

The out-of-band data stream 122 may be modulated onto the high-speed data stream 118 using any one or more of a number of techniques, including varying the average power, peak power, or extinction ratio of the outgoing physical layer signal. Similarly, an out-of-band data stream may be demodulated from an incoming physical layer signal using any one or more of a number of techniques, including measuring average power, peak power, or extinction ratio of the incoming physical layer signal. Additional details regarding techniques for modulating and/or demodulating out-of-band data are disclosed in U.S. patent application Ser. No. 10/824,258, entitled "OUT-OF-BAND COMMUNICATION BETWEEN NETWORK TRANSCEIVERS," filed Apr. 14, 2004, which application is fully incorporated herein by reference in its entirety.

The second communication module 110C can include one or more of the same components as the first communication module 110A, including a ROSA, TOSA, high-speed data control, and/or out-of-band data control. As such the second communication module 110C may be similar in configuration and operation to the first communication module 110A, and need not be explained in detail herein.

B. Testing Device 110B

Figure 2:
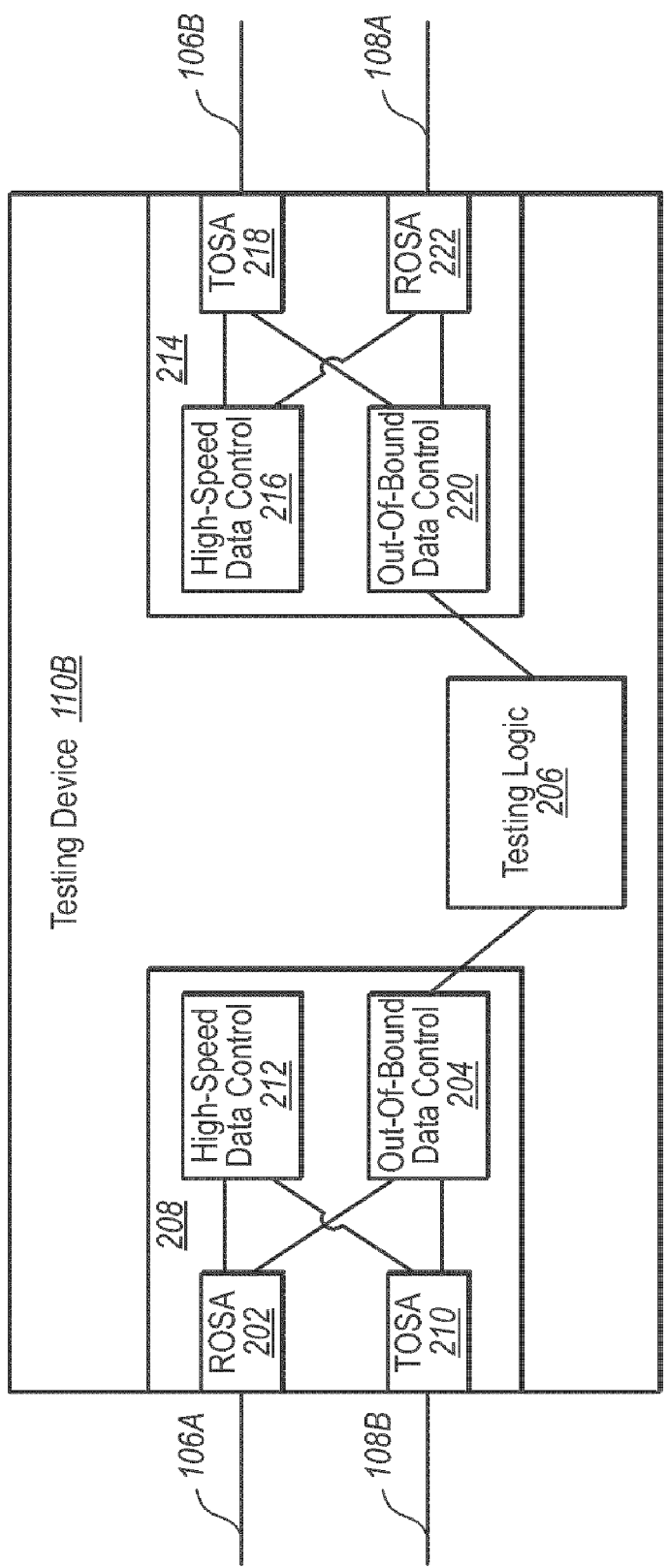
FIG. 2 illustrates one example of a testing device that can be employed in the communication network of FIG. 1.

The testing device 110B is configured to extract an out-of-band data stream from at least one of the physical layer signals transmitted on physical links 106, 108, the out-of-band data stream comprising diagnostic data, and to analyze the diagnostic data so as to determine one or more physical conditions of the physical links 106, 108. FIG. 2 discloses one example embodiment of the testing device 110B.

In the example of FIG. 2, the testing device 110B comprises at least a signal reception element 202, an out-of-band detector 204, and testing logic 206. The signal reception element 202 in the present example comprises a ROSA and can be similar in configuration and operation to the ROSA 114 of FIG. 1. Alternately or additionally, the signal reception element 202 comprises an optical detector. The signal reception element 202 is configured to receive a physical layer signal from a communication module, such as the first communication module 110A of FIG. 1, via physical link 106A, and to produce an incoming double modulated signal that includes a high-speed data signal and an out-of-band data signal comprising diagnostic data. Accordingly, the signal reception element 202 serves as one example of a means for receiving a double modulated physical layer signal.

The out-of-band detector 204 can be similar in configuration and operation to the out-of-band detector 120 of FIG. 1 and can comprise an out-of-band demodulator. The out-of-band detector 204 is coupled to signal reception element 202 and is configured to extract the out-of-band data signal from the incoming double modulated signal. Accordingly, out-of-band detector 204 serves as one example of a means for extracting an out-of-band data signal from an incoming double modulated physical layer signal.

The testing logic 206 is coupled to the out-of-band detector 204 and can comprise a processor, microprocessor, controller, microcontroller, or other logic. The testing logic 206 is configured to extract and analyze the diagnostic data from the out-of-band data signal. Alternately or additionally, the testing logic 206 identifies or determines one or more physical conditions of the physical link 106 using the diagnostic data. Accordingly, the testing logic 206 serves as one example of a means for extracting and analyzing diagnostic data from an out-of-band data signal to identify one or more physical conditions of a physical link.

With combined reference to FIGS. 1 and 2, in some embodiments, the testing device 110B is coupled to the physical link 106A at, e.g., a connector disposed somewhere between the first communication module 110A and second communication module 110C. As such, the testing device 110B can receive a physical layer signal, produce a double modulated signal using signal reception element 202, extract an out-of-band data signal from the double modulated signal using out-of-band control 204, and extract and analyze diagnostic data from the out-of-band data signal using testing logic 206 to identify or determine one or more physical conditions of the physical link 106.

Conventional testing devices used for high-speed networks require relatively expensive circuitry for processing high-speed data included in the physical layer signals. However, embodiments of the invention enable the use of relatively inexpensive testing devices for identifying or determining the physical condition of a physical link 106. More particularly, embodiments of the invention include testing devices 110B comprising signal reception element 202, out-of-band data control 204, and testing logic 206. According to some examples, the testing device 110B doesn't require any circuitry for processing high-speed data, only for processing out-of-band data. Further, as mentioned before, in many communication networks the frequency of the out-of-band data signal is orders of magnitude lower than the frequency of the high-speed data signal and can be processed by out-of-band data control 204 or other circuitry that is much less expensive than the circuitry required to process the high-speed data signal.

Optionally, however, the testing device 110B can further include high-speed data processing circuitry. For instance, in some embodiments, the signal reception element 202 and out-of-band detector 204 are included in a third communication module 208 that additionally includes a TOSA 210 and high-speed data control 212. Optionally, the testing device 110B further comprises a fourth communication module 214 comprising a high-speed data control 216, TOSA 218, out-of-band data control 220 and a ROSA 222.

Accordingly, in some embodiments, the testing device 110B is coupled to both of physical links 106 and 108 such that the testing device 110B allows high-speed data to reach the first and second communication modules 110A, 110C while still being able to extract diagnostic data to identify or determine physical conditions of the physical links 106, 108. In more detail, the signal reception element 202 receives a physical layer signal from first communication module 110A via physical link 106 and produces an incoming double modulated signal. The high-speed data control 212 extracts a high-speed data signal from the incoming double modulated signal and provides the high-speed data signal to high-speed data control 216, whereupon high-speed data control 216 modulates the high-speed data signal onto a physical layer signal produced by TOSA 218 for transmission to second communication module 110C via physical link 106B. At the same time, the out-of-band control 204 extracts the out-of-band data signal from the incoming double modulated signal such that testing logic 206 can extract diagnostic data from the out-of-band data signal. Optionally, the out-of-band data control 204 can also provide the out-of-band data signal to the out-of-band data control 220 for modulation onto the physical layer signal produced by TOSA 218.

In a similar manner, the testing device 110B can receive a physical layer signal from the second communication module 110C via physical link 108A at ROSA 222, extract diagnostic data therefrom, and produce another physical layer signal including a high-speed data signal and optionally an out-of-band data signal for transmission to the first communication device 110A via physical link 108B.

Although not shown, the testing device 110B can alternately or additionally include a user interface or can be communicatively couple to a user interface, such as a display, to communicate the physical condition of the physical links 106, 108 to a technician, system administrator, or other user.

II. Second Example Communication Network

Figure 3A:
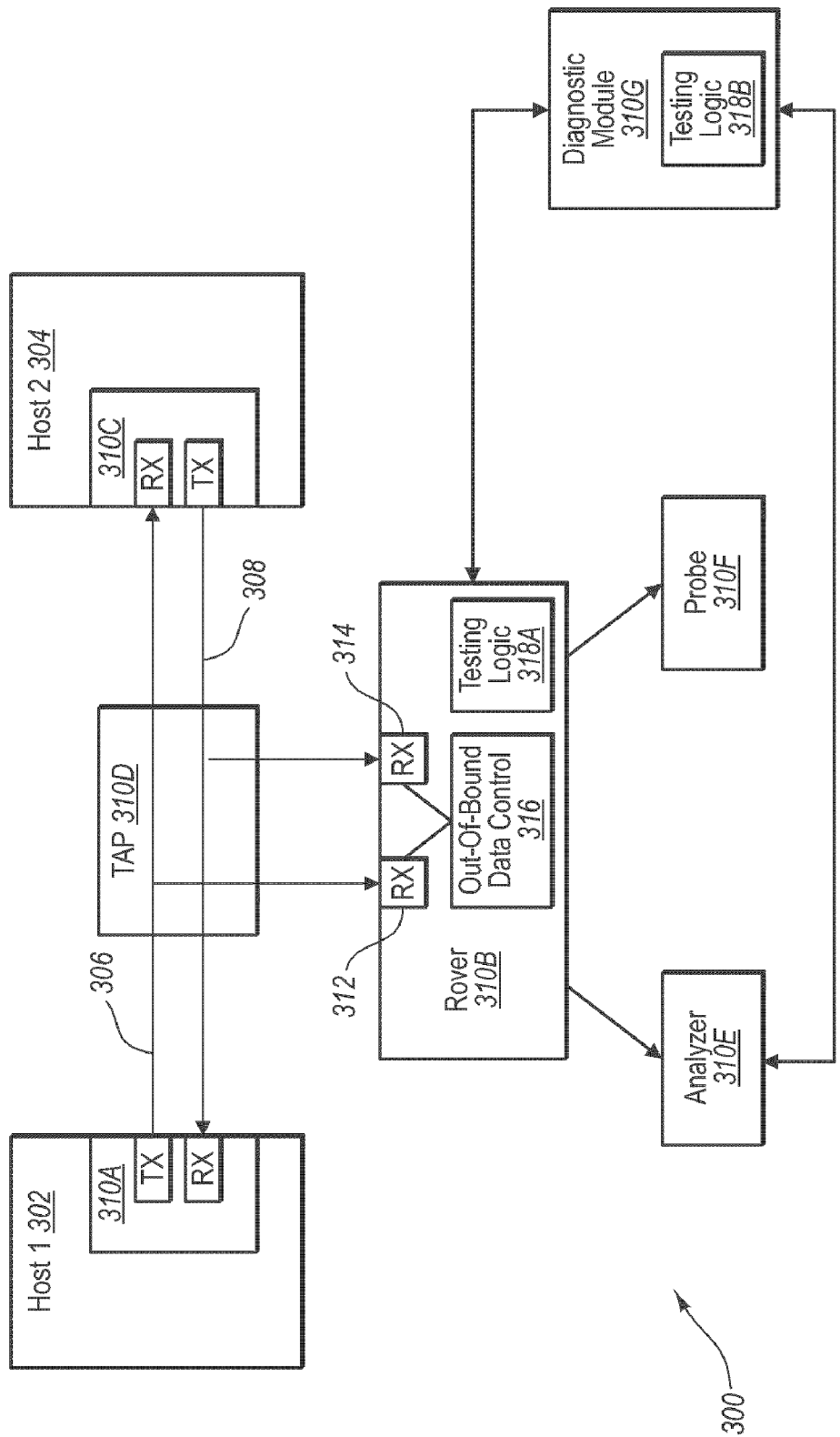
FIG. 3A illustrates another communication network in which embodiments of the invention can be implemented.

Referring now to FIG. 3A, a second example communication network 300 is disclosed in which embodiments of the invention can be practiced. The communication network 300 includes a first host device 302, a second host device 304, one or more physical links 306, 308 and a system comprising components 310A-310G (referred to herein as "system 310") for collecting physical layer data, including diagnostic data. More particularly, the system 310 includes at least a first communication module 310A and a testing device 310B. Optionally, the system 310 further includes one or more of a second communication module 310C, a tap 310D, an analyzer 310E, a probe 310F, or diagnostic module 310G.

The communication network 300 is similar in some respects to the communication network 100. For instance, communication network 300 can accomplish digital communication using the OSI model, although other models can alternately or additionally be employed. Additionally, first and second communication modules 310A, 310C are configured to send and receive physical layer signals via physical links 306, 308. Further, the physical layer signals are double modulated and include high-speed data signals and out-of-band data signals. The out-of-band data signals comprise diagnostic data generated by the first and second communications modules 310A, 310C and/or received by first and second communication modules 310A, 310C from first or second hosts 302, 304.

In contrast to the system 110 of FIG. 1, the testing device 310B of system 310 is not disposed directly between the ends of physical links 306, 308. Instead, the system 310 includes a tap 310D. The tap 310D is coupled between the physical links 306, 308 and the testing device 310B. Further, the tap 310D is configured to split a percentage of the physical layer signal transmitted on physical link 306, 308 to direct to the testing device 310B. This allows the testing device 310B to receive a percentage of the physical layer signals without significantly interfering with their transmission along physical links 306, 308. As such, the testing device 310B can receive physical layer signals and extract diagnostic data therefrom without retransmitting the physical layer signals. Although the tap 310D is disclosed as being coupled to two physical links 306, 308, the tap 310 can alternately or additionally be coupled to a single physical link or to three or more physical links.

In the example of FIG. 3A, the testing device 310B includes a plurality of signal reception elements 312, 314 configured to receive physical layer signals transmitted on physical links 306, 308 via the tap 310D. The signal reception elements 312, 314 can be similar in configuration and operation to signal reception element 202 of FIG. 2 and need not be explained in detail herein. The testing device 310B further includes an out-of-band data control 316 and testing logic 318A that can be similar in configuration and operation to out-of-band data control 204 and testing logic 206 of FIG. 2, and need not be explained in detail herein. Although not shown in FIG. 3A, in some embodiments each of signal reception elements 312, 314 is included in a corresponding communication module inserted into testing device 310B.

According to the present example, the testing device 310B comprises a roving device. For instance, the testing device 310B may comprise the Rover2G181 marketed by the Finisar Corporation or other type of roving device, such as any one of a variety of Finisar certified Physical layer switches ("PLS"). Generally, a roving device is configured to switch between or "rove" across a plurality of physical links to separately receive physical layer signals therefrom. The roving behavior of a roving device can be based on user-defined and/or default policies which determine the number of physical links in a roving group and/or a length of time to receive physical layer signals from each physical link before moving on to the next physical link. Accordingly, in addition to being configured to receive physical layer signals and extract diagnostic data therefrom, the testing device 310B can be further configured to rove across a plurality of physical links to identify or determine the physical condition of each of the physical links.

Although the components of the testing device 310B, including the signal reception elements 312, 314, out-of-band data control 316, and testing logic 318A have been described as being included in a roving device, the components of the testing device can alternately or additionally be included in other devices, including one or more of an analyzer 310, probe 310F, or diagnostic module 310G. As such, testing devices according to embodiments of the invention can comprise roving devices, analyzers, probes, diagnostic modules, or virtually any other device that includes a signal reception element, out-of-band data control, and testing logic and that can be coupled to a physical link to extract diagnostic data from physical layer signals transmitted on the physical link. Alternately or additionally, one or more of components 312, 314, 316, 318A can be included in one of devices 310B-310G, while the remaining components are included in one or more different devices 310B-310G. For instance, as shown in FIG. 3A, the diagnostic module 310G can include testing logic 318B, while signal reception elements 312, 314 and out-of-band data control 316 are provided on the testing device 310B.

In the present example, the analyzer 310E is coupled to the testing device 310B. One example of an analyzer 310E that can be employed according to some embodiments of the invention is marketed by the Finisar Corporation as the Xgig Analyzer. Generally, the analyzer 310E is configured to capture high-speed data at the input and/or output of certain points in the communication network 300 and to provide the high-speed data to the diagnostic module 310G. The captured high-speed data can be used by the diagnostic module 310G to, among other things, diagnose problems with traffic in the communication network 300. The analyzer 310E can be triggered by the diagnostic module 310G and/or by the testing device 310B upon the occurrence of one or more events. The triggers/events can be user-defined and/or default triggers or events.

The probe 310F is also coupled to the testing device 310B. One example of a probe 310F that can be employed according to some embodiments of the invention is marketed by the Finisar Corporation as the ProbeFCX probe. Generally, the probe 310F is configured to collect certain metrics from the physical layer signals transmitted in the communication network 300. For instance, in some embodiments, the probe 310F collects header data from the high-speed data signal by stripping out payload data from the high-speed data signal. Alternately or additionally, the probe 310 can provide the header data or other collected data to the diagnostic module 310G.

The diagnostic module 310G can be coupled to one or more of the testing device 310B, analyzer 310E, or probe 310F. One example of a diagnostic module 310G that can be employed according to some embodiments of the invention is marketed by Virtual Instruments Corporation as the NetWisdom SAN I/O Intelligence product. Generally, the diagnostic module 310G supports monitoring, analysis, and diagnosis of the communication network 300. For instance, the diagnostic module 310G can be configured to identify traffic trends in communication network 300 based on data collected by and received from analyzer 310E and/or probe 310F. When actual traffic on a given physical link 306, 308 deviates from a trend identified for that physical link 306, 308, the diagnostic module 310G can generate one or more alarms and/or trigger one or more of the testing device 310B, analyzer 310E or probe 310F to collect additional data. Further, although FIG. 3A discloses testing logic 318A, 318B provided on the testing device 310B and diagnostic module 310G, respectively, in some embodiments, the testing logic 318A or 318B is only provided on one of the testing device 310B or diagnostic module 310G.

III. Third Example Communication Network

Figure 3B:
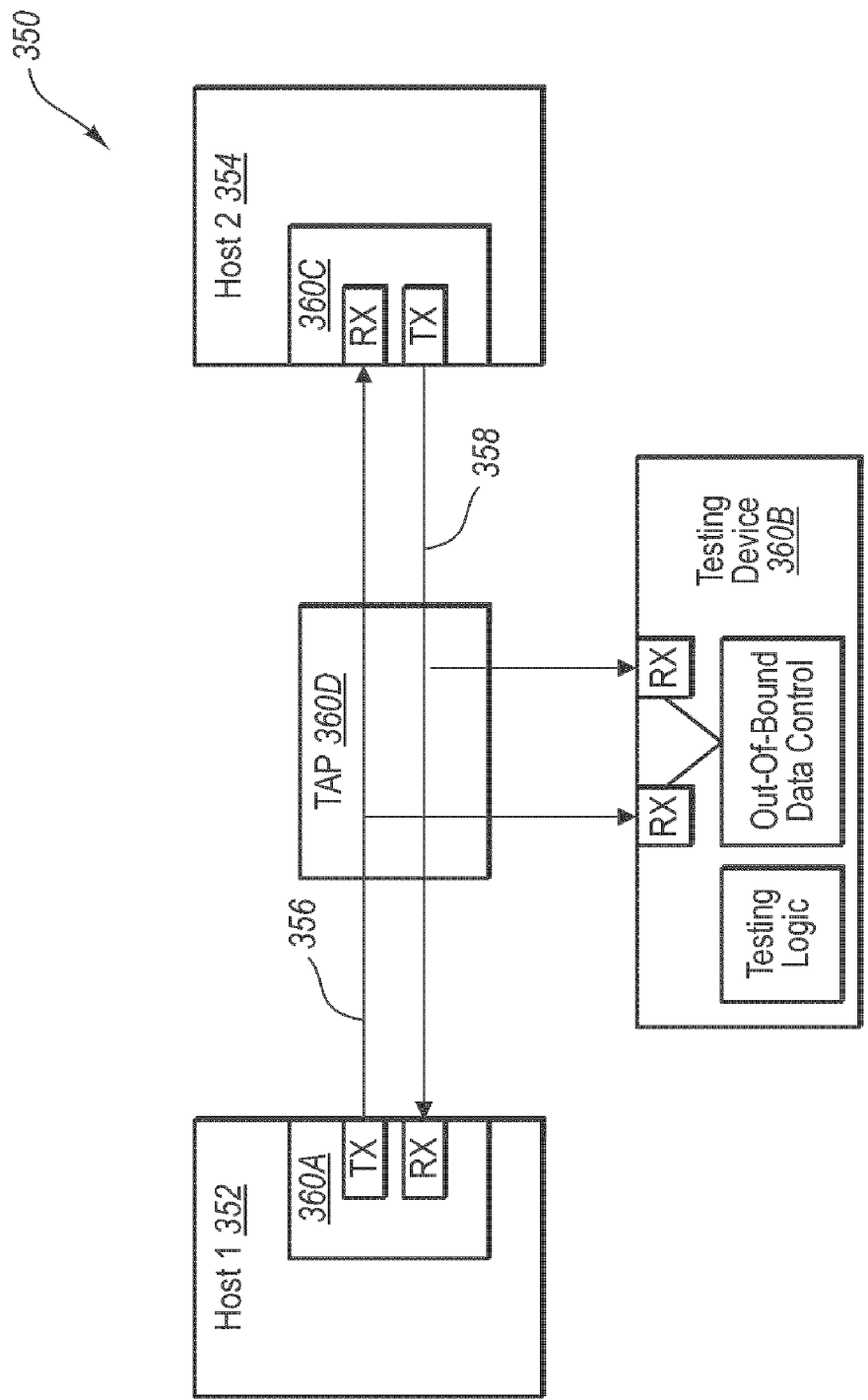
FIG. 3B illustrates yet another communication network in which embodiments of the invention can be implemented.

Referring now to FIG. 3B, a third example communication network 350 is disclosed in which embodiments of the invention can be practiced. The communication network 300 includes a first host device 352, a second host device 354, one or more physical links 356, 358 and a system comprising components 360A-360D (referred to herein as "system 360") for collecting physical layer data, including diagnostic data. More particularly, the system 360 includes at least a first communication module 360A and a testing device 360B. Optionally, the system 360 further includes one or more of a second communication module 360C and a tap 360D.

Accordingly, embodiments of the invention include various testing device configurations. For instance, FIG. 1 discloses a configuration in which the testing device 110B is directly coupled to one or more physical links 106, 108. FIG. 3B discloses a configuration in which the testing device 360B is coupled to one or more physical links 356, 358 via a tap 360D. FIG. 3A discloses another configuration in which the testing device 310B (or diagnostic module 310G comprising testing logic 318B) is coupled to one or more physical links 306, 308 via a tap 310D, the configuration of FIG. 3A further including one or more of a roving device, analyzer, probe or diagnostic module coupled to the testing device 310B. Other testing device configurations can alternately or additionally be implemented according to embodiments of the invention.

IV. Fault Analysis

As already explained above, embodiments of the invention allow a testing device, such as testing devices 110B, 310B, 360B of FIGS. 1-3B, to extract diagnostic data from a physical layer signal to identify or determine one or more physical conditions of a physical link. Such physical conditions can be representative of one or more faults in a physical link and can be used for fault analysis and/or diagnosing problems in a communication network. After a physical condition/fault has been identified or determined using the testing device 110B, 310B or 360B, a technician, system administrator, or other user can take appropriate corrective action.

For instance, the following Table 1 discloses a few examples of diagnostic data that can be extracted by the testing device 310B of FIG. 3A from physical layer signals transmitted via physical links 306, 308 in the left-hand column, and potential physical conditions or faults in the right-hand column corresponding to the diagnostic data in the left-hand column. The examples given in Table 1 are not intended to be exhaustive or limiting of the invention in any way and are provided solely by way of example. Indeed, depending on the configuration of a communication network, the correspondence between diagnostic data and physical conditions of a physical link may be the same or different from the correspondences disclosed in Table 1.

TABLE 1

| Diagnostic Data | Potential Physical Condition of Physical Link |
|---|---|
| 1. Transmit power normal and receive power low at first or second communication module 310A, 310B | Cable included in physical link 306 or 308 is bent, or first or second communication module 310A, 310C is approaching end of life expectancy |
| 2. Transmit power normal at first communication module 310A and no receive power at second communication module 310C or at signal reception element 312 | Cable included in physical link 306 is cut between the first communication module 310A and the tap 310D |
| 3. Transmit power normal at first communication module 310A, no receive power at second communication module 310C, receive power normal at signal reception element 312 | Cable included in physical link 306 is cut between the tap 310D and the second communication module 310C |
| 4. Transmit power normal at second communication module 310C, no receive power at signal reception element 314 or at first communication module 310A | Cable included in physical link 308 is cut between the second communication module 310C and the tap 310D |

TABLE 1-continued

| Diagnostic Data | Potential Physical Condition of Physical Link |
|---|---|
| 5. Transmit power normal at second communication module 310C, no receive power at first communication module 310A, receive power normal at signal reception element 314 | Cable included in physical link 308 is cut between the tap 310D and the first communication module 310A. |
| 8. Transmit power low at the first communication module 310A and receive power low at second communication module 310C and at signal reception element 312 | Problem with first communication module 310A |
| 9. Transmit power low at second communication module 310C and receive power low at first communication module 310A and at signal reception element 314 | Problem with second communication module 310C |
| 10. Lo or Hi voltage out of range alarm or warning message from first or second communication module 310A, 310C | Problem with power supply at first or second communication module 310A, 310C |
| 11. Lo or Hi alarm or warning message on transmission power of first or second communication module 310A, 310C | Problem with first or second communication module 310A, 310C |
| 12. Laser bias current for first or second communication module 310A, 310B is trending higher | First or second communication module 310A, 310B is approaching end of life expectancy |

Figure 4:
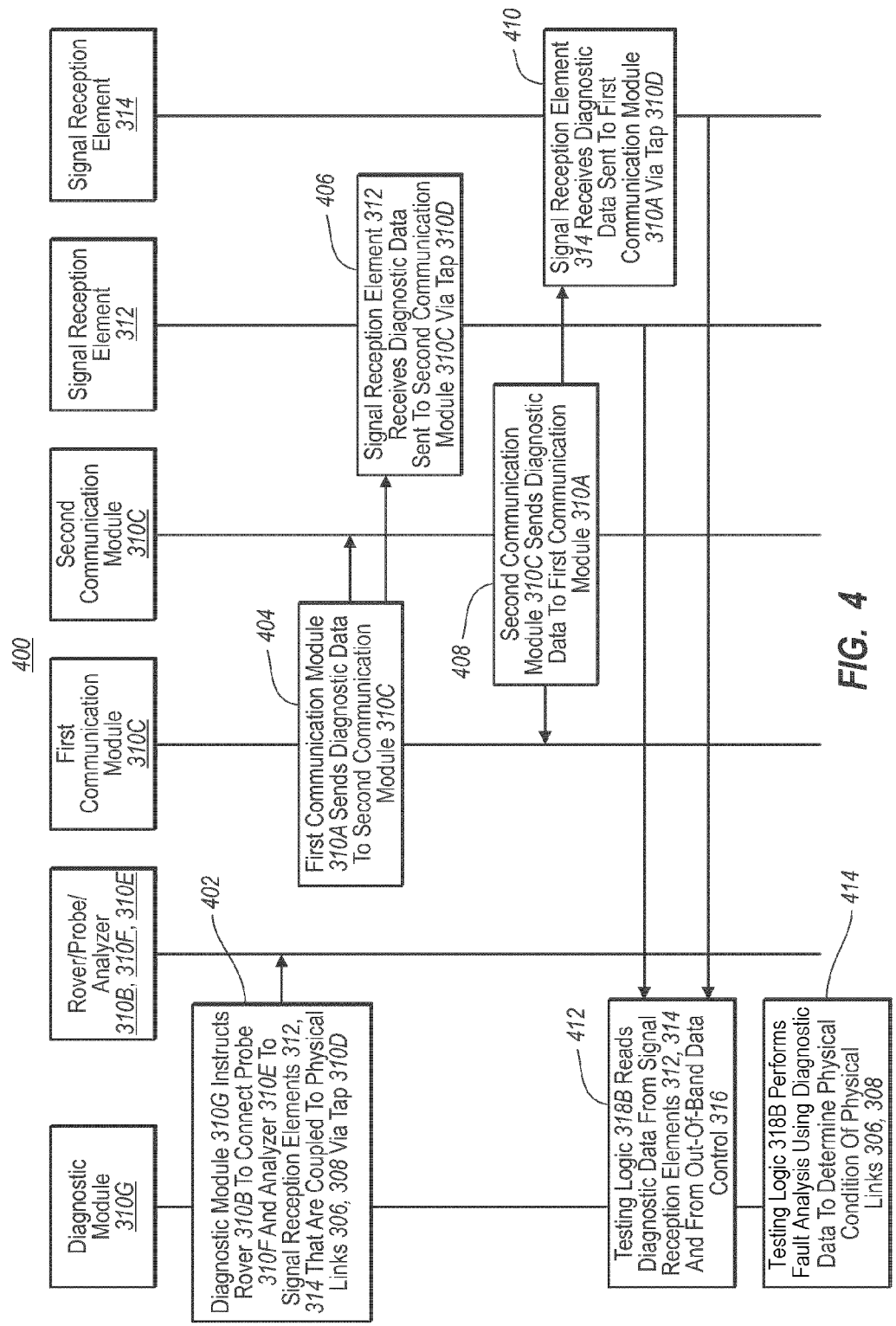
FIG. 4 illustrates an example method that can be implemented in the communication network of FIG. 3A.

FIG. 4 discloses an example method 400 that can be implemented in the communication network 300 of FIG. 3A when collecting diagnostic data and performing fault analysis. In the example of FIG. 4, the testing logic 318B is implemented in diagnostic module 310G, rather than implementing testing logic 318A in testing device 310B.

The method 400 begins at 402 when the diagnostic module 310G instructs the testing device 310B, comprising a roving device, to connect the probe 310F and/or analyzer 310E to signal reception elements 312, 314 that are coupled to physical links 306, 308 via tap 310D. In some embodiments, the testing device 310B comprising a roving device includes a plurality of signal reception elements, each signal reception element being connected to a different physical link via tap 310D. Accordingly, step 402 allows the diagnostic module 310G to collect diagnostic data generated by particular communication modules, as well as data collected by the probe 310F and/or analyzer 310E, from particular physical links. Step 402 can further include the testing device 310B connecting the probe 310F and/or analyzer 310E to signal reception elements 312, 314.

At step 404, the first communication module 310A sends diagnostic data to the second communication module 310C. At step 406, the signal reception element 312 receives, via tap 310D, the diagnostic data sent by the first communication module 310A to the second communication module 310C. At step 408, the second communication module 310C sends diagnostic data to the first communication module 310A. At step 410, the signal reception element 314 receives, via tap 310D, the diagnostic data sent by the second communication module 310C to the first communication module 310A.

At step 412, testing logic 318B reads diagnostic data from signal reception elements 312, 314 and/or from the out-of-band data control 316. At step 414, testing logic 318B performs fault analysis on the physical links 306, 308, using the diagnostic data to determine or identify the physical condition of physical links 306, 308. Identifying or determining the physical condition of physical links 306, 308 can include looking up a particular combination of diagnostic data in a table accessible to the testing logic 318B to identify a probable or potential physical condition or fault of the physical link that is associated with the particular combination of diagnostic data.

The method 400 disclosed in FIG. 4 is only one example of a method that can be implemented in communication networks 100 and 300 according to embodiments of the invention. Embodiments within the scope of the invention include methods that rearrange the order of steps 402, 404, 406, 408, 410, 412, 414, that omit one or more of steps 402, 404, 406, 408, 410, 412, 414 and/or that further include one or more additional steps.

V. Fourth Example Communication Network

In the communication networks 100, 300, 350 of FIGS. 1-3B, testing devices 110B, 310B, 360B are coupled between two nodes of the communication networks 100, 300, 350 to extract diagnostic data for the physical links 106, 108, 306, 308, 356, 358 between the two nodes of the communication networks 100, 300, 350. However, embodiments of the invention are not limited to communication networks with testing devices that extract diagnostic data for a given physical link between two nodes by being coupled directly between the two nodes.

Figure 5:
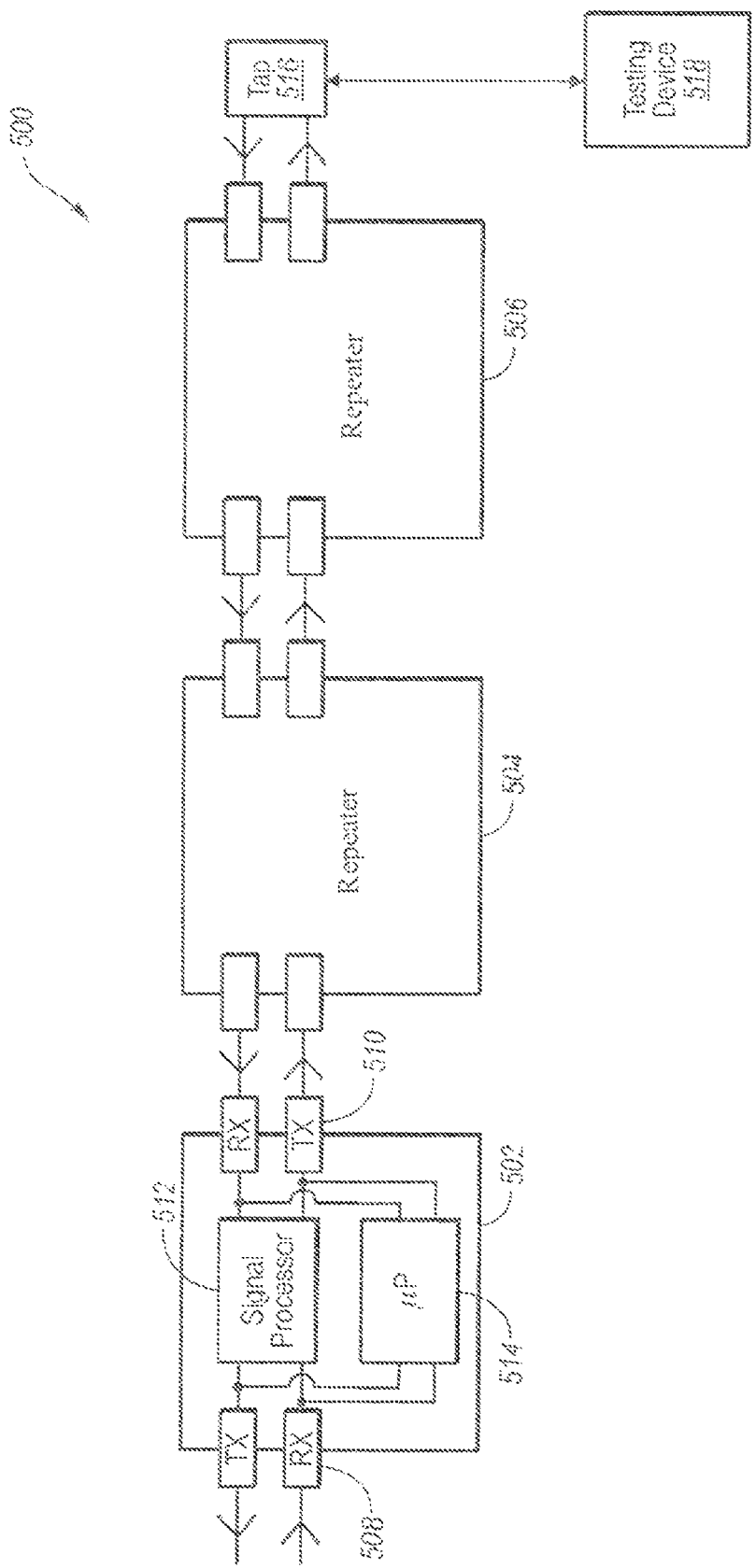
FIG. 5 illustrates yet another communication network in which embodiments of the invention can be implemented.

For instance, referring now to FIG. 5, a third example communication network 500 is disclosed that allows a testing device to extract diagnostic data for a given physical link between two nodes without being coupled between the two nodes. In more detail, the communication network 500 includes a plurality of repeaters 502, 504, 506. Some long-haul data transmission applications and/or other applications require that intermediary repeaters be used to ensure that data of suitable quality can be transmitted across the long haul data link. For example, transmission along a fiber-optic cable from one end of the United States to the other end of the United States may require intermediary repeaters to accomplish the transmission with suitable signal quality.

FIG. 5 shows a first repeater 502 that includes a ROSA 508 and a TOSA 510. Notably, each of the ROSA 58 and/or TOSA 510 can be included in one or more communication modules as part of the repeater 502. The repeater 502 receives a signal at the ROSA 508. The signal is passed to a signal processor 512 that may perform various digital signal processing tasks, such as removing noise, boosting signal power or other tasks to improve the quality of the signal. The processed signal is then passed to the TOSA 510 for transmission to repeater 504, where it may be further processed and retransmitted by repeaters 504 and 506. Repeater 502 also includes out-of-band logic such as a microprocessor 514 or other out-of-band data control that, among other things, may be used to extract and insert out-of-band data onto the signal sent and received by the repeater 502.

At any point in the communication network 500, a tap 516 can be deployed to split a percentage of a physical layer signal to direct to testing device 518. The tap 516 and testing device 518 can be similar in configuration and operation to the tap 310D and testing device 310B of FIG. 3A and need not be explained in detail herein.

In one example, digital diagnostic data for the repeater 502 is sent as out-of-band data through the communication network 500 of repeaters. The out-of-band data may be concatenated by each of the repeaters 502, 504, 506 in the chain to include digital diagnostic data for each of the repeaters 502, 504, 506. Thus, the health of repeaters in the communication network can be monitored by the testing device 518 that is remote from at least some of the repeaters 502, 504, 506. One example of where this is useful is a network in which a repeater 502 or 504 is located in a remote location, such as a rural area, an uninhabited region, or on the ocean floor. When troubleshooting network problems, it may be prohibitively expensive to physically retrieve and test repeaters. However, where diagnostic information for each of the repeaters is included in out-of-band communications, the health and status of the repeater may be monitored remotely such that it is unnecessary to physically retrieve and test the repeater. More particularly, where the out-of-band data is concatenated by each of the repeaters 502, 504, 506, the testing device 518 can extract all of the concatenated out-of-band data and then extract corresponding diagnostic data to identify or determine the physical condition of the repeaters 502, 504, 506 or the physical condition of the physical links interconnecting the repeaters 502, 504, 506.

In some embodiments of the invention, the out-of-band data that includes digital diagnostic data from each of the repeaters 502, 504, 506 may also be used to monitor the health of fiber optic links between the repeaters 502, 504, 506. For example, when the digital diagnostic data includes the power of a transmitted signal and the power of a received signal, calculations can be done by subtracting the power received by a receiving repeater from the power sent by a sending repeater to the receiving repeater. Significant power loss may indicate the need to repair or replace a link between repeaters.

Alternately or additionally, configuration information, firmware updates, control signals, or the like, may be sent as out-of-band data to a remote host, repeater or other device. This helps to avoid the expensive prospect of physically retrieving or being physically in the presence of the device to configure the device, update the device's firmware, and/or control the device. Configuration information may include, for example, instructions for the device to shut off, information designating a communication rate, information indicating that laser power should be reduced or suspended, etc.

Alternately or additionally, diagnostic data may be requested or automatically sent by a device. In one embodiment, a device can check to insure compatibility with other devices on a network by requesting information such as identification information. In some embodiments, the identification information includes information about the manufacturer of a particular device such that a device requesting diagnostic information may be able to determine that the particular device has been qualified for use with the device requesting diagnostic information.

Alternately or additionally, diagnostic data, such as signal loss across a physical link, can be determined. For example, a device may indicate the power at which a signal is transmitted. A device that receives a signal may indicate in out-of-band data the amount of power received. Thus by comparing the power of the signal sent with the power of the signal received, the loss caused by the physical link between the two devices can be determined.

In yet other embodiments of the invention, security can be maintained between devices in a network by sending identification and authentication information using the out-of-band data. Hardware or software encoded encryption keys exist on devices within the network which can be used to generate identification information or encrypted tokens for presenting to other devices in a network. Thus a secure connection can be implemented between devices where those devices are appropriately matched to one another using hardware embedded encryption keys and the out-of-band data to communicate authentication and identification information.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A testing device, comprising:
a rover configured to rove a plurality of physical links, each physical link connected to a communication module and having a physical layer signal thereon from the respective communication module;
a signal reception element configured to receive the physical layer signal from each physical link and to produce an incoming double modulated signal for each physical layer signal, the incoming double modulated signal including a high-speed data signal and an out-of-band data signal, the out-of-band data signal comprising diagnostic data of the communication module from which the physical layer signal proceeds;
an out-of-band detector that is coupled to the signal reception element and is configured to extract the out-of-band data signal from each incoming double modulated signal; and
testing logic that is coupled to the out-of-band detector and is configured to extract and analyze the diagnostic data from each out-of-band data signal.

2. The testing device of claim 1, wherein each communication module comprises one of a plurality of first communication modules, the testing device further comprising a second communication module that includes the signal reception element and the out-of-band detector.

3. The testing device of claim 2, wherein the first and second communication modules each comprise an optoelectronic transceiver or an optoelectronic transponder.

4. The testing device of claim 1, wherein the testing device further comprises an analyzer.

5. The testing device of claim 1, wherein the testing device further comprises a probe.

6. The testing device of claim 1, wherein the signal reception element comprises an optical detector.

7. The testing device of claim 1, wherein the testing logic is further configured to identify one or more physical conditions of the physical link using the diagnostic data.

8. The testing device of claim 1, wherein the diagnostic data includes one or more of: a temperature of the communication module, a supply voltage of the communication module, a bias current of an optical transmitted included in the communication module, a receive power of an optical detector included in the communication module, an error indicator for the communication module, or a power on time for the communication module.

9. The testing device of claim 1, wherein the diagnostic data comprises first diagnostic data, the out-of-band data signal further comprising second diagnostic data that includes one or more of a control signal from a host to which the communication module is coupled or a firmware update.

10. A system for collecting physical layer data for a physical link, the system comprising
a first communication module configured to emit a physical layer signal onto first physical link for reception by a second communication module, the physical layer signal comprising a double modulated signal modulated with a high-speed data signal and an out-of-band data signal, the out-of-band data signal comprising diagnostic data of the first communication module;
means for receiving the physical layer signal, the means for receiving being coupled to the first physical link;
means for extracting the out-of-band data signal from the physical layer signal, the means for extracting being coupled to the means for receiving;
means for extracting and analyzing the diagnostic data from the out-of-band data signal to identify one or more physical conditions of the first physical link, the means for extracting and analyzing being coupled to the means for extracting; and
a tap coupled between the first physical link and the means for receiving, the tap configured to split a percentage of the double modulated physical layer signal from the first physical link to direct to the means for receiving.

11. The system of claim 10 wherein the means for receiving comprises an optical detector.

12. The system of claim 10, wherein the means for extracting comprises an out-of-band detector.

13. The system of claim 10, wherein the means for extracting and analyzing comprises one or more of: testing logic, a processor, a microprocessor, a controller, or a microcontroller.

14. The system of claim 10, wherein the means for receiving, means for extracting, and means for extracting and analyzing are included in one or more of: a rover, a probe, an analyzer, or a diagnostic module.

15. The system of claim 10, further comprising a rover configured to rove a plurality of physical links including the first physical link such that the means for receiving receives each of a plurality of physical layer signals transmitted on the plurality of physical links, the means for extracting extracts an out-of-band data signal from each of the physical layer signals, and the means for extracting and analyzing extracts and analyzes diagnostic data from each of the out-of-band data signals to identify one or more physical conditions of each of the plurality of physical links.

16. The system of claim 10, further comprising a probe coupled to the means for receiving.

17. The system of claim 10, further comprising an analyzer coupled to the means for extracting and analyzing.

18. A system for collecting physical layer data for a physical link, the system comprising
a first communication module configured to emit a physical layer signal onto a first physical link for reception by a second communication module, the physical layer signal comprising a double modulated signal modulated with a high-speed data signal and an out-of-band data signal, the out-of-band data signal comprising diagnostic data of the first communication module; and
means for receiving the physical layer signal, the means for receiving being coupled to the first physical link;
means for extracting the out-of-band data signal from the physical layer signal, the means for extracting being coupled to the means for receiving;
means for extracting and analyzing the diagnostic data from the out-of-band data signal to identify one or more physical conditions of the first physical link, the means for extracting and analyzing being coupled to the means for extracting; and
a repeater that includes the first communication module, the repeater comprising:
a receiver adapted to receive a data signal;
a signal processor coupled to the receiver, the signal processor being adapted to perform processing tasks on the data signal;
a transmitter coupled to the signal processor, the transmitter adapted to receive the data signal from the processor and to transmit the data signal; and out-of-band logic coupled to the signal processor, the out-of-band logic configured to:
extract out-of-band data from the data signal, wherein the out-of-band data includes diagnostic data from at least one remote repeater;
concatenate data corresponding to diagnostic data for the repeater to the out-of-band data such that the out-of-band data includes the diagnostic data for the repeater and the at least one remote repeater; and
insert the out-of-band data including the data corresponding to diagnostic data for the repeater and the at least one remote repeater onto the data signal;

wherein:
the means for receiving is further configured to receive the data signal;
the means for extracting is further configured to extract the out-of-band data from the data signal; and
the means for extracting and analyzing is further configured to extract and analyze the diagnostic data for the repeater and the at least one remote repeater from the out-of-band data to identify one or more physical conditions of a physical link between the repeater and the at least one repeater.

\* \* \* \* \*